United States Patent
Pidduck

(10) Patent No.: US 10,083,235 B2
(45) Date of Patent: Sep. 25, 2018

(54) NUMERIC VALUE DECAY FOR EFFICIENT RELEVANCE COMPUTATION

(71) Applicant: Open Text SA ULC, Halifax (CA)

(72) Inventor: Patrick Thomas Sidney Pidduck, Waterloo (CA)

(73) Assignee: Open Text SA ULC, Halifax (CA)

( * ) Notice: Subject to any disclaimer, the term of this patent is extended or adjusted under 35 U.S.C. 154(b) by 86 days.

(21) Appl. No.: 14/079,785

(22) Filed: Nov. 14, 2013

(65) Prior Publication Data

US 2014/0207747 A1 Jul. 24, 2014

Related U.S. Application Data

(60) Provisional application No. 61/754,052, filed on Jan. 18, 2013.

(51) Int. Cl.
*G06F 17/30* (2006.01)

(52) U.S. Cl.
CPC .............................. *G06F 17/30864* (2013.01)

(58) Field of Classification Search
CPC ......... G06F 17/30613; G06F 17/30551; G06F 17/30864
See application file for complete search history.

(56) References Cited

U.S. PATENT DOCUMENTS

| | | | |
|---|---|---|---|
| 6,571,238 B1 * | 5/2003 | Pollack | G06Q 10/107 |
| 7,953,740 B1 | 5/2011 | Vadon et al. | |
| 7,976,311 B2 * | 7/2011 | Bantz | G09B 5/00 |
| | | | 434/219 |
| 8,260,771 B1 * | 9/2012 | Ortega | G06F 17/30997 |
| | | | 707/723 |
| 9,092,510 B1 * | 7/2015 | Stets, Jr. | G06F 17/30648 |
| 9,223,897 B1 * | 12/2015 | Gross | G06F 17/3053 |
| 2003/0078915 A1 * | 4/2003 | Chaudhuri et al. | 707/3 |
| 2003/0135490 A1 * | 7/2003 | Barrett | G06F 17/30867 |
| 2004/0015524 A1 * | 1/2004 | Chalstrom | G06F 17/30067 |
| 2004/0083205 A1 * | 4/2004 | Yeager | G06F 17/30616 |
| 2007/0038615 A1 * | 2/2007 | Vadon | G06F 17/273 |
| 2008/0281610 A1 * | 11/2008 | Yoshida et al. | 705/1 |
| 2008/0301117 A1 * | 12/2008 | Zeng | G06F 17/30864 |

(Continued)

*Primary Examiner* — James Trujillo
*Assistant Examiner* — Jessica N Le
(74) *Attorney, Agent, or Firm* — Sprinkle IP Law Group

(57) ABSTRACT

Search engines today are capable of incorporating numeric scoring modifiers from controlling applications into their relevance computations. Challenges arise in keeping these modifiers current, given that they may change over time. Embodiments provide a new way to compute numeric value decay for efficient relevance computation without having to rely on a controlling application. The controlling application can set a value for a modifier of an object managed by the controlling application and the controlling application can perform operations on the modifier. However, the controlling application does not need to keep track of the modifier and compute the modifier value independently. Rather, a search engine is configured to perform decay computation(s) and adjust the modifier value on a regular basis or on demand. The search engine ensures that modifier values for all the objects indexed by the search engine are always valid—within acceptable ranges and with acceptable adjustments.

20 Claims, 3 Drawing Sheets

(56) References Cited

U.S. PATENT DOCUMENTS

| | | | |
|---|---|---|---|
| 2010/0287033 A1* | 11/2010 | Mathur | G06F 17/30867 705/319 |
| 2011/0055186 A1* | 3/2011 | Gopalakrishnan | 707/706 |
| 2011/0078156 A1* | 3/2011 | Koss | G06Q 10/04 707/748 |
| 2011/0184928 A1* | 7/2011 | Vadon | G06F 17/30867 707/706 |
| 2012/0215773 A1* | 8/2012 | Si | G06Q 30/02 707/723 |
| 2013/0054582 A1* | 2/2013 | Macklem et al. | 707/723 |
| 2013/0204859 A1* | 8/2013 | Vijaywargi | G06F 17/30867 707/709 |
| 2013/0268536 A1* | 10/2013 | Nachiappan et al. | 707/741 |

* cited by examiner

| 302 DATA POINT | 304 OPERATION | 306 ADJUSTMENT | 308 MODIFIER VALUE | COMMENTS |
| --- | --- | --- | --- | --- |
| 1 | CREATE | | 4 | DEFAULT VALUE IS 4 |
| 2 | DECAY | | 4 | ALREADY AT REST, NO CHANGE |
| 3 | SET | 8 | 8 | VALUE PROVIDED FOR INDEXING |
| 4 | INCREASE | 2 | 10 | |
| 5 | DECAY | | 9 | |
| 6 | INCREASE | 2 | 11 | |
| 7 | INCREASE | 2 | 12 | LIMITED TO MAXIMUM VALUE |
| 8 | INCREASE | 2 | 12 | MAXIMUM VALUE, NO CHANGE |
| 9 | INCREASE | 2 | 12 | MAXIMUM VALUE, NO CHANGE |
| 10 | DECAY | | 11 | |
| 11 | DECAY | | 10 | |
| 12 | INCREASE | 3 | 12 | LIMITED TO MAXIMUM VALUE |
| 13 | DECAY | | 11 | |
| 14 | DECAY | | 10 | |
| 15 | DECAY | | 9 | |
| 16 | DECAY | | 8 | |
| 17 | DECAY | | 7 | |
| 18 | DECAY | | 6 | |
| 19 | DECAY | | 5 | |
| 20 | DECAY | | 4 | |
| 21 | DECAY | | 4 | ALREADY AT REST, NO CHANGE |
| 22 | DECAY | | 4 | ALREADY AT REST, NO CHANGE |
| 23 | DECREASE | -3 | 1 | |
| 24 | DECAY | | 2 | |
| 25 | DECAY | | 3 | |
| 26 | DECAY | | 4 | |
| 27 | DECAY | | 4 | ALREADY AT REST, NO CHANGE |
| 28 | DECAY | | 4 | ALREADY AT REST, NO CHANGE |

FIG. 3

NUMERIC VALUE DECAY FOR EFFICIENT RELEVANCE COMPUTATION

CROSS-REFERENCE TO RELATED APPLICATION(S)

This is a conversion of and claims a benefit of priority from U.S. Provisional Application No. 61/754,052, filed Jan. 18, 2013, entitled "NUMERIC VALUE DECAY FOR EFFICIENT RELEVANCE COMPUTATION," which is hereby incorporated herein for all purposes.

TECHNICAL FIELD

This disclosure relates generally to the field of information retrieval and, more particularly, to the optimization of hybrid text and metadata search systems.

BACKGROUND

A search engine is a computer program or a set of programs used to *index* information and search for indexed information. One of the tasks performed by a search engine is the computation of the relevance of objects that are searchable by the search engine. Relevance is a complex topic, and includes many variables and methods for assigning relevance scores. Within this relevance computation, one of the key elements is assessing contribution to relevance based on properties whose importance may decline over time.

Consider an example. A news article is posted on a social web site. One hundred (100) readers "like" the news article, and three (3) other readers "dislike" the article. Using feedback mechanisms on the web site, they make their likes and dislikes known. The 100 "likes" and 3 "dislikes" now become useful information for search relevance. If another reader searches for information, the search engine can consider that there is a net difference of 97 positive reactions to this article, and adjust the relevance of the comment to rank higher in the search results.

The web site is topical, however. The importance of the likes and dislikes need to be discounted over time. If no additional reactions are recorded, then a month later the 97 likes should be given less consideration in scoring the search relevance. However, if readers continue to express strong "likes" for the article, then continued high relevance is appropriate.

Another example is frequency of use. In a document management system, a document that is accessed many times is more likely to be relevant in search results than a document which has not been accessed frequently, or which has been accessed only rarely in recent weeks. From a search relevance perspective, the number of accesses should increase relevance, but the relevance should gradually drop over time if it is no longer accessed. The recent frequency of document access becomes an important factor for the search engine attached to the document management system in determining the relevance of the document.

Search engines today are capable of incorporating numeric scoring modifiers into their relevance computations. The challenges that arise are related to keeping these modifiers current, given that they are expected to change over time.

As an example, assume that a modifier should be devalued by 1 every day until it reaches a value of 0. One way of implementing this process is for a controlling application to keep track of the modifier, reducing it by 1 each day, and issuing a transaction to the search engine every day for every object that needs to have the modifier changed. A transaction is an operation or set of operations. Each transaction in this case is atomic by nature, which means that either all of the operations in the transaction occur, or none of them occur. An application can perform multiple operations and calculations in a single transaction. One example of a controlling application may be document management software. With this approach, each such controlling application may issue a very large number of transactions to a search engine, impacting the performance of the search engine. This approach also places a part of the burden of computing modifier values on each controlling application.

Another approach would be to implement a "last changed" time and date associated with each modifier in the search index. The relevance computation could then devalue the modifier based on the difference between the last changed time and the current time. A problem with this approach is that storing the additional time information increases the memory requirements in the search engine, and the additional computation steps during the relevance ranking process can reduce the speed of evaluating search queries. If the controlling application wants to update the modifier, it may not have access to the current "effective" value of the modifier that is hidden within the search engine's relevance computation code.

Given the deficiencies in conventional search engines, there is room for innovations and improvements.

SUMMARY OF THE DISCLOSURE

An objective of this invention is to improve the mechanism by which a search engine obtains and uses numeric relevance scoring information. This objective is achieved in a search system, method, and computer program product configured for efficient relevance computation. The search system may be communicatively connected to various devices on a network. Embodiments of a search system disclosed herein comprise a search engine communicatively connected to at least one controlling application running, for instance, on a server computer on the network. The search system may further include a data storage component communicatively connected to the search engine. The data storage component may store objects that are indexed and searchable by the search engine. The data storage component may implement at least one non-transitory computer readable medium. Examples of non-transitory computer-readable media are provided below. Examples of a controlling application can include a content server, a document management system, etc.

In some embodiments, the computation of changes in modifier values is provided by the search engine rather than the controlling application. The controlling application can set this value, and it can also command the execution of relative operations on the modifier, such as increasing or decreasing the modifier. The search engine, however, performs the actual updates to the modifier.

The controlling application can include configuration controls that allow upper and lower limits for a modifier to be set, and a rate of decay towards a neutral position to be established. As an example, a controlling application such as a content server may provide such configuration controls via a graphical user interface running on a client device communicatively connected to the content server.

The search engine may apply adjustments to the modifier on a regular basis, for instance, as a scheduled task, or when a related search is received. The search engine may ensure that modifier values are always valid—within acceptable ranges, and with acceptable adjustments.

In operation, the controlling application can perform tasks such as 'upvoting' an object by issuing a transaction to the search engine to increase the current modifier value by a relative amount. The search engine may ensure that minimum or maximum values are enforced, and the controlling application does not need to store or compute the modifier value independently.

In some embodiments, a system having a processor and a non-transitory computer-readable storage medium such as a memory can be configured to implement the search system. In some embodiments, a computer program product may include one or more non-transitory computer-readable storage media storing computer instructions that are executable or translatable by at least one processor to implement the search system.

Numerous other embodiments are also possible.

Embodiments disclosed herein can provide many advantages. For example, a controlling application does not need to perform independent computations on a modifier. A controlling application does not need to store and remember modifier values. Multiple controlling applications can independently make relative adjustments to modifier values without needing to coordinate their activities, or be concerned that the modifier values are valid. A controlling application does not need to issue transactions to the search engine on a regular basis to change modifier values for idle objects. These benefits can alleviate the load on the controlling application, allowing more resources such as computational power and memory available to the controlling application. When systems have millions (or more) of objects where many are idle (such as in a document management application), the reduction in transactions to the search engine can be significant.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 3 is a chart depicting exemplary operations of a search engine applying adjustments to a single modifier value according to a decay computation.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Search engines are often employed by systems and applications such as content servers, document management systems, web sites, etc. for fast retrieval of information. Such systems and applications are collectively referred to herein as controlling applications. A search engine can have many features and capabilities that can be useful to various controlling applications. For example, a search engine can search the metadata and text of documents in a search index to determine which documents match search criteria without the controlling application having to parse the document itself. Such documents are an example of objects that can be controlled or managed by a controlling application.

Before describing embodiments in detail, it may be helpful to discuss an example search engine in the context of a search system.

Figure 1:
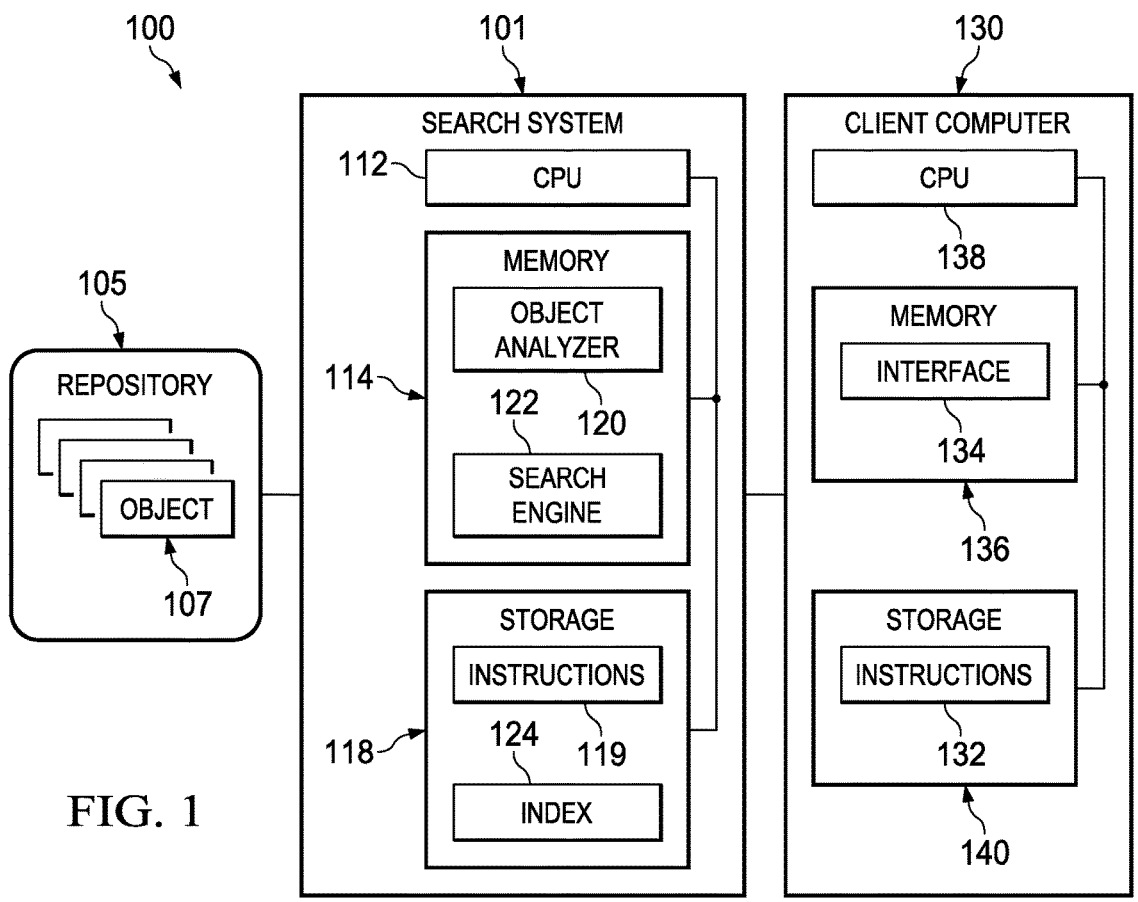
FIG. 1 depicts one embodiment of a computing environment in which one embodiment of a search system can be implemented.

FIG. 1 depicts a block diagram illustrating an example of computing environment 100 having object repository 105, search system 101, and client computer 130. Object repository 105 may comprise a file server or database system or other storage mechanism remotely or locally accessible by search system 101. Object repository 105 may store objects 107 (e.g., documents, images, emails or other objects) that may be searchable by search system 101.

In the embodiment of FIG. 1, search system 101 comprises a server having central processing unit 112 connected to memory 114 and storage unit 118 via a bus. Central processing unit 112 may represent a single processor, multiple processors, a processor(s) with multiple processing cores and the like. Storage unit 118 may include a non-transitory storage medium such as hard disk drives, flash memory devices, optical media and the like. Search system 101 may be connected to a data communications network (not shown).

Storage unit 118 stores computer executable instructions 119 and index 124. Computer executable instructions 119 can represent multiple programs and operating system code. In one embodiment, instructions 119 are executable to provide object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indices or other arrangements of information. While shown as a single index, index 124 may include multiple indices.

Client computer system 130 may include components similar to those of the server of search system 101, such as CPU 138, memory 136, and storage 140. Additionally, client computer system 130 may include executable instructions 132 to provide user interface 134 that allows a user to enter a search query. The user interface may be provided through a web browser, file system interface or other program.

Those skilled in the art will appreciate that search system 101 shown in FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 may analyze objects in object repository 105 to determine information to be indexed in index 124. When an object is added to search system 101, two types of information are generally indexed, one or both full text and metadata. As an example, suppose object 107 being added to search system 101 is a text file, the text or content of the file is indexed as well as information about the file. In some cases, the metadata itself may include important information associated with the object. This metadata may need its own descriptive metadata indicating attributes of the metadata. In some cases, the metadata on its own without full text content is sufficient to represent an object. Object analyzer 120 can send indexing instructions to search engine 122 to direct search engine 122 to add, modify, or delete metadata or text in index 124.

Object analyzer 120 may be a portion of a larger program, such as a document management program, may be a separate program or may be implemented according any suitable programming architecture. In one embodiment, the process of determining metadata and text to be indexed may be carried out by any number of different programs on a computer system or distributed across computer systems. Detailed discussions concerning an example of an object analyzer can be found in U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA," which is fully incorporated by reference herein.

As noted above, one of the tasks performed by a search engine is the complex computation of the relevance of objects. Embodiments described herein include a system and method for assessing contribution to relevance based on properties whose importance may decline or increase over time.

Figure 2:
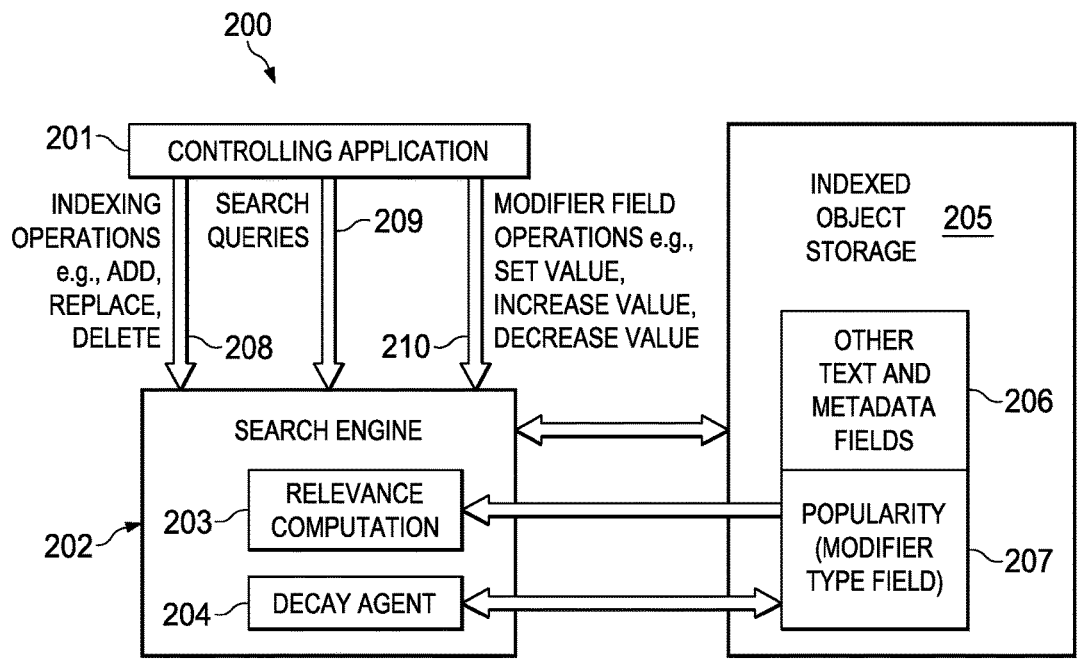
FIG. 2 depicts a diagrammatic representation of an example of one embodiment of a system capable of decay and efficient relevance computations.

FIG. 2 illustrates a non-limiting example embodiment of a system for numeric value decay for relevance computation. In the example illustrated, system 200 includes a controlling application 201, although this is not required. Controlling application 201 may define a Modifier type metadata field, such as Voting Popularity or Frequency of Use, as will be described in greater detail below. Advantageously, controlling application 201 provides information on likes and dislikes, set values, etc., but does not itself perform popularity and/or decay calculations.

Representing an example of a search system such as search system 101 described above, system 200 may further include search engine 202. In embodiments disclosed herein, search results can be scored for relevance by search engine 202 with reduced intervention by controlling application 201. Embodiments do not limit or redefine the many other features and capabilities of a search engine.

As discussed above, when an object is added to a search system, two types of information may be indexed, one or both of full text and metadata. There are often many metadata fields for an associated object. The metadata may describe the objects being indexed. In certain cases, the metadata itself may include important information associated with the object. This metadata may need its own descriptive metadata indicating attributes of the metadata. Metadata values may require or desire to be described by a plurality of attributes such as language, color, and/or country of origin. Each of the metadata fields may have one or more values.

As will be described in greater detail below, in some embodiments, search engine 202 may implement a numeric data type with defined behaviors. For description purposes, this numeric data type is referred to herein as a Modifier. For example, a data field labeled "Popularity" may be defined as a Modifier data type. In this example, the numeric value in Modifier type field 207 (which is also referred to as "Modifier data field(s)" in this disclosure) represents a certain degree or level of popularity.

In some embodiments, multiple Modifier data fields may be defined. In some embodiments, an object may have none, many, or a single Modifier data field populated. Values for Modifier data fields (Modifier values) may be sparsely populated. A Modifier value may be attached to any object indexed within the search engine. Objects may have separate and distinct Modifier values.

In some embodiments, Modifier data fields may be "multi-valued" in nature. A multi-valued field can retain multiple data points and allow calculations to be performed on the multiple data points in a single Modifier data field for an object. As will be described in greater detail below, a Modifier value can be incorporated into computations made by a search engine to establish relevance for objects in a search query. An example of a search engine supporting multi-valued fields is provided in the above-referenced U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA."

In the example of FIG. 2, relevance computation 203 represents the functional block or control logic in search engine 202 that computes the relevance of an object to a search query. Relevance computation 203 may use metadata value(s) with a type of a Modifier (e.g., value(s) in modifier type field 207) in addition to other inputs into the relevance computation. Relevance computation 203 can include many factors—such as term frequency or object type preference. The contribution of Modifier value(s) from Modifier type field 207 may be only one element of this computation.

In operation, a Modifier value may be created, set, and/or deleted in the usual manner for a search engine, for instance, as a field for an object to be indexed. To this end, indexing operations 208 may include operations that are common for indexing and updating objects in search engines. In one embodiment, indexing operations 208 may include "Add", "Replace, and "Delete" operations. The Modifier values can be manipulated in the same manner as values in other data fields in the search engine.

The full text and metadata values that are indexed by search engine 202 may be stored in indexed object storage 205. Indexed object storage 205 may be located in some combination of memory and persistent storage. As illustrated in FIG. 2, the search index may also include other text and metadata fields 206 storing indexed text and metadata values that are searchable by search engine 202.

As noted above, a Modifier may be implemented as a numeric data type with defined behaviors. A Modifier can be implemented using integer or real values. For computational purposes, an implied decimal point with integers may also be used. For example, with three implied decimal points, the integer value 17,345 would be interpreted as 17.345.

A Modifier data field may retain the properties of standard search engine metadata fields. For example, the value of a Modifier can be retrieved by a search engine. As another example, Modifier values can be used in a search query. Using a Modifier in a query would allow searches such as "find all objects that have values greater than 6 in the 'Popularity' Modifier field".

The definition of a Modifier data type can include some or all of the following attributes:
  Minimum possible value. Any attempt to set or adjust a Modifier to a lower value is either ignored or limited to this minimum value.
  Maximum possible value. Any attempt to set or adjust a Modifier to a higher value is either ignored or limited to this maximum value.
  Resting value. A Resting value refers to a numeric point at which the value of a Modifier should approach and possibly reach, depending on a decay algorithm (an example of which is described below).
  Decay parameters. Multiple possible types of decay algorithms are possible that would permit Modifier values to approach the Resting value over time. The definition of a decay algorithm and associated parameters may be configurable.
  Maximum positive adjustment. If an implementation allows relative adjustments, either by value or algorithms such as multipliers, then a maximum upward adjustment may be configured.
  Maximum negative adjustment. If an implementation allows relative adjustments, either by value or algorithms such as multipliers, then a maximum downward adjustment may be configured.

The configuration of the example Modifier attributes listed above may be made in a number of possible ways, including but not limited to one or more of:

Default settings
  Creation or definition by means of an Application Programming Interface (API)
  Definition with a configuration file, such as an Extensible Markup Language (XML) description or a Microsoft Windows ".INI" file
  Storage within a database or data repository.

Additional operations (e.g., Modifier field operations 210) can allow relative adjustment of values in a Modifier data field. For example, sample indexing or index update transactions may include:
  Add a value to a current Modifier. If the definition of the Modifier includes a Maximum value, then the search engine will ensure that this limit is not exceeded.
  Subtract a value from a current Modifier. If the definition of the Modifier includes a Minimum value, then the search engine will ensure that the value does not fall below this limit.
  Multiply a current Modifier by a value. This value may be referred to as a factor or a multiplier. Note that such a multiplier may be relative to the Resting value for the Modifier data field. For example, if the current value of a Modifier data field is 10, the Resting value is 4, and the multiplier value is +10%, the new Modifier value for the Modifier data field will be (10−4)×1.10+4, or 10.6. If the definition of the Modifier includes Maximum or Minimum values, then search engine will ensure that the Modifier value stays within these limits.

From time to time, a search engine may apply a decay computation to adjust the values contained within Modifier data fields (the "Decay" of the numeric variables). The decay computation can be triggered in several possible ways. In some embodiments, a decay computation can be applied at scheduled times, such as daily, weekly, monthly, or any predetermined and/or configurable time interval. In some embodiments, other triggering events such as an external trigger by means of a programming interface are also possible. For example, in one embodiment, a decay computation may be performed only when relevance computation 203 is performed.

The decay computation does not need to be applied to all objects at the same time. In some embodiments, decay computations can be performed on subsets of the objects, with idle time between processing subsets. This approach ensures that there are no material delays in the response of the search engine that might occur if applying a decay computation to a very large number of objects.

Any number of possible methods may be used to compute the Decay of the numeric variables. Example decay computation methods include, but are not limited to:
  Adding or subtracting a constant to the current value of the Modifier field. For example, subtract 1 while the current value is greater than the Resting value.
  Factoring by a constant. For example, reduce the Modifier value by 10% each day.
  Halflife. Computing a time interval at which the value of the Modifier should be reduced by half. A halflife uses factoring by a constant, but determines the constant based on the frequency of applying Decay and the desired halflife of the Modifier value.

Embodiments of decay computations may be optimized in various ways. For example, many of the values in a Modifier field may be at or near the Resting value. Each value retained consumes space in the search index, and adds time to the relevance computations. When Modifier values are at the Resting value, or sufficiently close to the Resting value, they can be deleted from the search index to save space. In this case, a system component running the computations for adjusting Modifier values or computing relevance understands that absence of a Modifier value should be treated as if the Modifier is defined and has the Resting value.

Referring to FIG. 2, relevance computation 203 represents a system component (e.g., a relevance computation component) responsible for computing relevance utilizing values in Modifier data fields (e.g., Modifier type field 207) and Decay agent 204 represents a system component (e.g., a decay computation component) responsible for adjusting values in the Modifier data fields. Decay agent 204 can be configured to perform one or more decay computations described above based on some criteria such as time, scheduled events, external triggers (external to system 200), etc. In some embodiments, if there are no external changes or adjustments in the Modifier values, then over time Decay agent 204 may cause the Modifier values to converge on a Resting value. In some embodiments, Decay agent 204 may update all Modifier data fields for all stored objects on a periodic basis or on demand. In one embodiment, Decay agent 204 may update Modifier data fields for a particular object when a query related thereto is received.

Accordingly, Modifier data fields can be updated responsive to Modifier field operations 210 as well as Decay agent 204 operations. The Modifier values in the Modifier data fields can then be used by relevance computation 203 when a query is received.

Search queries 209 may leverage relevance computations 203. In some embodiments, search results responsive to search queries 209 may be enhanced depending upon the implementation to indicate when Modifier values are at their Resting, Maximum, or Minimum values.

Modifier field operations 210 describe the new types of transactions that a controlling application 201 may need in order to implement embodiments described herein. This may include the relative Increase and Decrease operations, or programmatic definitions of the Modifier type fields. Although these are shown as distinct operations in this illustration, in practice these capabilities may be implemented as variations or extensions to other existing programming interfaces that are exposed by the search engine.

Figure 4:
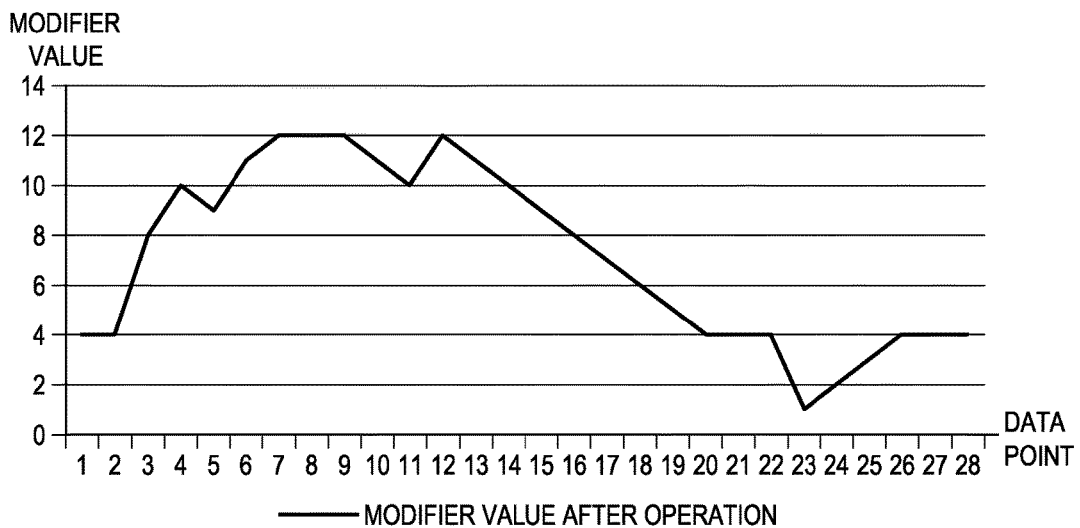
FIG. 4 is a plot diagram showing changes to the modifier value as adjusted by the exemplary operations depicted in FIG. 3.

By way of illustration, and not of limitation, the chart of FIG. 3 shows an example of a set of operations performed on a single Modifier value 308. This example illustrates exemplary Data Points 302, Operations 304, Adjustments 306, and associated resulting value for Modifier value 308. FIG. 4 shows a plot diagram corresponding to the example of FIG. 3. In this example, a Modifier is created (via a "Create" operation) at Data Point 1 and given a default value of 4. A linear decay computation is used to adjust Modifier value 308 by 1 towards a Resting value of 4. Thus, a Decay operation is performed at Data Point 2. However, since the default value is already at the Resting value of 4, the Decay operation does not result in a change to Modifier value 308. At Data Point 3, a value (8) for the Modifier is provided during indexing (via a "Set" operation that might be, for example, included in indexing operations 108). Subsequently, the Modifier value may be increased (e.g., Data Points 4, 6-9, and 12), decayed (e.g., Data Points 5, 10-11, 13-22, and 24-28), and decreased (e.g., Data Point 23) via various operations. Notice after Modifier value 308 reaches the Maximum value of 12 at Data Point 7 and again at Data Point 12, the decay computation operates to reduce Modifier value 308 towards the Resting value of 4. When Modifier value 308 reaches the Resting value of 4 at Data Point 20, the decay computation operates to maintain Modifier value 308 at the Resting value of 4. When Modifier value 308 falls below the Resting value of 4 due to a "Decrease" operation at Data Point 23, the decay computation operates to increase Modifier value 308 towards the Resting value of 4 and again maintain Modifier value 308 at the Resting value of 4 once that value is reached. These adjustments to Modifier value 308 are shown in the plot diagram of FIG. 4.

As a specific example, Modifier type field 207 may represent the popularity of a document (an example of an object) in a document management system. When first created (Data Point 1), the data field named "Popularity" of the document has a default popularity score of 4. A privileged or authorized user (e.g., an author of the document) identifies it to be important and gives it a value of 8 (Data Point 3). In the next few days, the document is 'upvoted' by several users of the document management system, increasing the popularity of the document to the maximum value of 12 (Data Points 4, 6-9, and 12). Over time, the document becomes less important, and decays back to the Resting level popularity of 4 (Data Point 20). One user later 'downvotes' the document, dropping the popularity down to 1 (Data Point 23), which recovers back to the Resting value of 4 as it decays over time (Data Point 26).

In this example, the adjustment operations are initiated by a controlling document management application (which can be an example of controlling application 201). As described above, the controlling document management application provides some information (e.g., the set value, the increase or 'upvote' value(s), and the decrease or 'downvote' value in FIG. 3), but does not perform any relevance computation and/or decay computation. Rather, a search engine connected to the document management application (e.g., search engine 202) can adjust the popularity value with each decay operation and ensure that the values stay within acceptable limits. When a query "find all documents that have a popularity score higher than 6" is received at the search engine, relevance computation 203 can use the popularity value from Modifier type field 207, in addition to other inputs, to compute the relevance of the document to this query.

Figure 5:
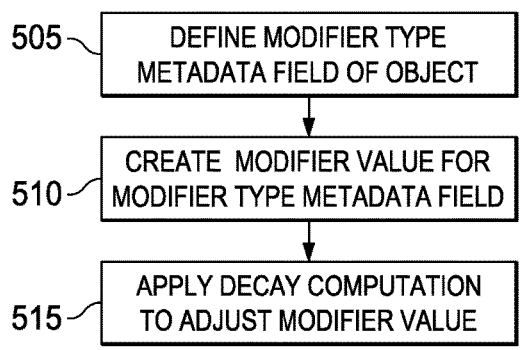
FIG. 5 is a flow diagram illustrating an example of one embodiment of a method of relevance computation.

Accordingly, a method of relevance computation can be summarized with reference to FIG. 5. At step 505, a controlling application, such as controlling application 201 described above, may define a modifier type metadata field of an object. At step 510, a decay computation component of a search engine, such as decay agent 204 of search engine 202 described above, may create a modifier value in the modifier type metadata field of the object. The decay computation component may be embodied on a non-transitory computer readable medium and the search engine may be communicatively connected to the controlling application over a network connection. At step 515, the decay computation component of the search engine may adjust the modifier value in the modifier type metadata field of the object toward a predetermined resting value. Various types of adjustments may be made, including adding a constant to the modifier value or multiplying a factor to the modifier value. The decay computation component is configured for ensuring that the modifier value does not exceed a maximum value and/or fall below a minimum value. The modifier value may be adjusted on a periodic basis, on demand, or in response to a triggering event such as in response to a transaction issued by the controlling application. The controlling application may issue various types of transactions such as indexing and index updating transactions that may cause the decay computation component to adjust the modifier value of the modifier type metadata field of the object. In some embodiments, the decay computation component may be configured to delete, from an index storing modifier values of indexed objects, certain modifier values that are at or sufficiently close to the predetermined resting value.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being complied compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A method, comprising:
creating, by a decay computation component of a search engine of a search system, a modifier value in a modifier type metadata field of a first object stored in a repository, the search engine implementing a modifier having a numeric data type representing a degree of popularity or frequency of use, the modifier type metadata field representing the modifier, the repository communicatively connected to the search system, the decay computation component embodied on a non-transitory computer readable medium of the search system, the search engine communicatively connected to an application over a network connection, wherein the modifier type metadata field of the first object stored in the repository is defined by the application, the search engine configured for computing relevance of the first object with respect to a search query based at least in part on the modifier value in the modifier type metadata field of the first object stored in the repository, the decay computation component of the search engine configured for adjusting values in modifier type metadata fields of objects stored in the repository; and adjusting, by the decay computation component of the search engine, the modifier value in the modifier type metadata field of the first object stored in the repository towards a resting value, the resting value representing a numeric point at which the modifier value in the modifier type metadata field of the first object stored in the repository is to approach or reach, the adjusting performed by the decay computation component of the search engine:
  on a periodic basis,
  in response to a demand to perform a computation to update the modifier value in the modifier type metadata field of the first object stored in the repository, or
  in response to a triggering event.

2. The method according to claim 1, wherein the repository comprises an indexed object storage, the indexed object storage storing a plurality of objects searchable by the search engine, the method further comprising:
  searching, by the search engine, the plurality of objects using the modifier value.

3. The method according to claim 1, wherein the adjusting comprises adding a constant or multiplying a factor to the modifier value and wherein the decay computation component of the search engine is configured for ensuring that the modifier value does not exceed a maximum value.

4. The method according to claim 1, wherein the adjusting comprises subtracting a constant from the modifier value or reducing the modifier value by a factor and wherein the decay computation component of the search engine is configured for ensuring that the modifier value does not fall below a minimum value.

5. The method according to claim 1, wherein the adjusting comprises computing a time interval and reducing the modifier value by half at the computed time interval.

6. The method according to claim 1, wherein the adjusting the modifier value in the modifier type metadata field of the first object is performed by the decay computation component of the search engine in response to a transaction issued by the application and received by the search engine.

7. The method according to claim 1, wherein the search engine is communicatively connected to a plurality of controlling applications, the method further comprising adjusting the modifier value in the modifier type metadata field of the first object in response to indexing or index update transactions issued by the plurality of controlling applications.

8. A system, comprising:
  a search engine communicatively connected to an application executing on one or more server machines, the search engine implementing a modifier having a numeric data type representing a degree of popularity or frequency of use; and
  an indexed object storage communicatively connected to the search engine,
    the indexed object storage storing a plurality of objects searchable by the search engine,
    the plurality of objects including a first object having a modifier type metadata field, the modifier type metadata field representing the modifier,
    wherein the modifier type metadata field of the first object stored in the repository is defined by the application,
    the search engine configured for computing relevance of the first object with respect to a search query based at least in part on the modifier value in the modifier type metadata field of the first object stored in the repository,
  wherein the search engine comprises a decay computation component embodied on a non-transitory computer readable medium,
    the decay computation component of the search engine configured for adjusting a modifier value in the modifier type metadata field of the first object stored in the repository towards a resting value,
    the resting value representing a numeric point at which the modifier value in the modifier type metadata field of the first object stored in the indexed object storage is to approach or reach,
    the adjusting performed by the decay computation component of the search engine:
      on a periodic basis,
      in response to a demand to perform a computation to update the modifier value in the modifier type metadata field of the first object stored in the repository, or
      in response to a triggering event.

9. The system of claim 8, wherein the search engine further comprises a relevance computation component for computing a relevance of the first object relative to a query received from the application based at least in part on the modifier value in the modifier type metadata field of the first object as adjusted by the decay computation component.

10. The system of claim 8, wherein the decay computation component of the search engine adjusts the modifier value in the modifier type metadata field of the first object by adding a constant or multiplying a factor to the modifier value and ensures that the modifier value does not exceed a maximum value.

11. The system of claim 8, wherein the decay computation component of the search engine adjusts the modifier value in the modifier type metadata field of the first object by subtracting a constant from the modifier value or reducing the modifier value by a factor and ensues that the modifier value does not fall below a minimum value.

12. The system of claim 8, wherein the decay computation component of the search engine adjusts the modifier value in the modifier type metadata field of the first object by computing a time interval and reducing the modifier value by half at the computed time interval.

13. The system of claim 8, wherein the decay computation component of the search engine adjusts the modifier value in the modifier type metadata field of the first object in response to a transaction issued by the application and received by the search engine.

14. The system of claim 8, wherein the search engine is communicatively connected to a plurality of controlling applications and wherein the decay computation component of the search engine is further configured for adjusting the modifier value in the modifier type metadata field of the first object in response to indexing or index update transactions issued by the plurality of controlling applications.

15. A computer program product comprising at least one non-transitory computer readable medium storing instructions executable by a search engine embodied on one or more server machines operating in a network to cause the search engine to perform:
  creating, by a decay computation component of the search engine, a modifier value in a modifier type metadata field of a first object stored in a repository, the search engine implementing a modifier having a numeric data type representing a degree of popularity or frequency of use, the modifier type metadata field representing the modifier, the search engine communicatively connected to an application over a network, wherein the modifier type metadata field of the first object stored in the repository is defined by the application, the search engine configured for computing relevance of the first object with respect to a search query based at least in part on the modifier value in the modifier type metadata field of the first object stored in the repository, the decay computation component of the search engine configured for adjusting values in modifier type metadata fields of objects stored in the repository; and adjusting the modifier value in the modifier type metadata field of the first object stored in the repository towards a resting value, the resting value representing a numeric point at which the modifier value in the modifier type metadata field of the first object stored in the repository is to approach or reach, the adjusting performed by the decay computation component of the search engine:

on a periodic basis, in response to a demand to perform a computation to update the modifier value in the modifier type metadata field of the first object stored in the repository, or in response to a triggering event.

16. The computer program product of claim 15, wherein the repository comprises an indexed object storage, the indexed object storage storing a plurality of objects searchable by the search engine, wherein the instructions are further executable by the search engine to perform:

searching the plurality of objects using the modifier value.

17. The computer program product of claim 15, wherein the adjusting comprises adding a constant or multiplying a factor to the modifier value and wherein the decay computation component of the search engine is configured for ensuring that the modifier value does not exceed a maximum value.

18. The computer program product of claim 15, wherein the adjusting comprises subtracting a constant from the modifier value or reducing the modifier value by a factor and wherein the decay computation component of the search engine is configured for ensuring that the modifier value does not fall below a minimum value.

19. The computer program product of claim 15, wherein the adjusting comprises computing a time interval and reducing the modifier value by half at the computed time interval.

20. The computer program product of claim 15, wherein the adjusting the modifier value in the modifier type metadata field of the first object is performed by the decay computation component of the search engine in response to a transaction issued by the application and received by the search engine.

* * * * *